US012626514B1

(12) United States Patent
Jain et al.

(10) Patent No.: US 12,626,514 B1
(45) Date of Patent: May 12, 2026

(54) METHOD AND SYSTEM FOR RELIABLY IDENTIFYING AND PROVIDING A VIDEO FEED OF A DETECTED INCIDENT IN A VIDEO SURVEILLANCE SYSTEM

(71) Applicant: Honeywell International Inc., Charlotte, NC (US)

(72) Inventors: Abhishek Jain, Madurai (IN); Amit Kumar Grewal, Bhiwani (IN); Ganesh Ramesh Hegde, Pune (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 19/007,108

(22) Filed: Dec. 31, 2024

(51) Int. Cl.
| | |
|---|---|
| *G06V 20/52* | (2022.01) |
| *G06F 3/14* | (2006.01) |
| *H04N 23/695* | (2023.01) |
| *H04N 23/90* | (2023.01) |

(52) U.S. Cl.
CPC ................ *G06V 20/52* (2022.01); *G06F 3/14* (2013.01); *H04N 23/695* (2023.01); *H04N 23/90* (2023.01)

(58) Field of Classification Search
CPC ...... H04N 23/90; H04N 23/695; G06V 20/52; G06F 3/14
USPC ................................. 348/143, 153–156, 159
See application file for complete search history.

(56) References Cited

U.S. PATENT DOCUMENTS

| | | |
|---|---|---|
| 11,228,715 B2 | 1/2022 | Ida et al. |
| 11,770,506 B2 * | 9/2023 | Kerst ........................ G06T 7/73 |
| | | 348/159 |
| 11,800,063 B2 | 10/2023 | Arikuma et al. |
| 2023/0319415 A1 | 10/2023 | Dhayalan et al. |

OTHER PUBLICATIONS

Xie, Y., et al., "Integration of Multi-Camera Video Moving Objects and GIS", ISPRS Int. J. Geo-Inf., vol. 8, No. 12, 2019, 20 pages.

* cited by examiner

*Primary Examiner* — Sherrie Hsia
(74) *Attorney, Agent, or Firm* — Seager, Tufte & Wickhem, LLP

(57) ABSTRACT

A video surveillance system and method for a facility includes multiple video cameras mounted at locations with corresponding coordinates. Each camera has a Field of View (FOV) extending to cover a FOV range defined by coordinates that define a FOV volume. A controller receives incident location coordinates and determines which cameras have FOV volumes that encompass the incident location. The system automatically displays video from cameras covering the incident while excluding video from cameras not covering the incident. In some cases, the system supports Pan-Tilt-Zoom (PTZ) cameras with preset positions, automatically moving PTZ cameras to positions that cover an incident location. The system can handle incidents spanning location ranges and can identify blind spots not covered by any camera's FOV.

20 Claims, 8 Drawing Sheets

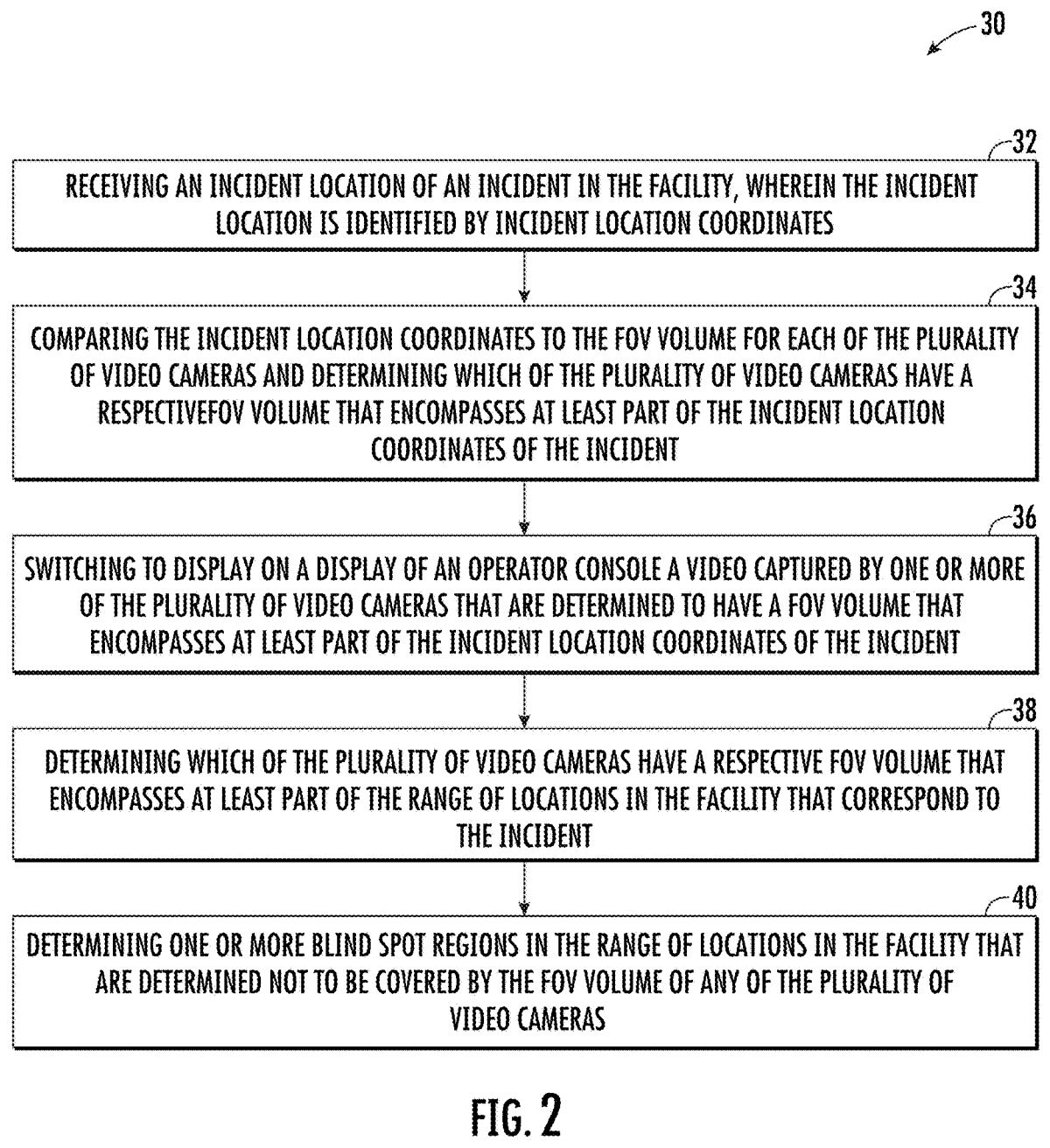

30

32

RECEIVING AN INCIDENT LOCATION OF AN INCIDENT IN THE FACILITY, WHEREIN THE INCIDENT LOCATION IS IDENTIFIED BY INCIDENT LOCATION COORDINATES

34

COMPARING THE INCIDENT LOCATION COORDINATES TO THE FOV VOLUME FOR EACH OF THE PLURALITY OF VIDEO CAMERAS AND DETERMINING WHICH OF THE PLURALITY OF VIDEO CAMERAS HAVE A RESPECTIVEFOV VOLUME THAT ENCOMPASSES AT LEAST PART OF THE INCIDENT LOCATION COORDINATES OF THE INCIDENT

36

SWITCHING TO DISPLAY ON A DISPLAY OF AN OPERATOR CONSOLE A VIDEO CAPTURED BY ONE OR MORE OF THE PLURALITY OF VIDEO CAMERAS THAT ARE DETERMINED TO HAVE A FOV VOLUME THAT ENCOMPASSES AT LEAST PART OF THE INCIDENT LOCATION COORDINATES OF THE INCIDENT

38

DETERMINING WHICH OF THE PLURALITY OF VIDEO CAMERAS HAVE A RESPECTIVE FOV VOLUME THAT ENCOMPASSES AT LEAST PART OF THE RANGE OF LOCATIONS IN THE FACILITY THAT CORRESPOND TO THE INCIDENT

40

DETERMINING ONE OR MORE BLIND SPOT REGIONS IN THE RANGE OF LOCATIONS IN THE FACILITY THAT ARE DETERMINED NOT TO BE COVERED BY THE FOV VOLUME OF ANY OF THE PLURALITY OF VIDEO CAMERAS

FIG. 2

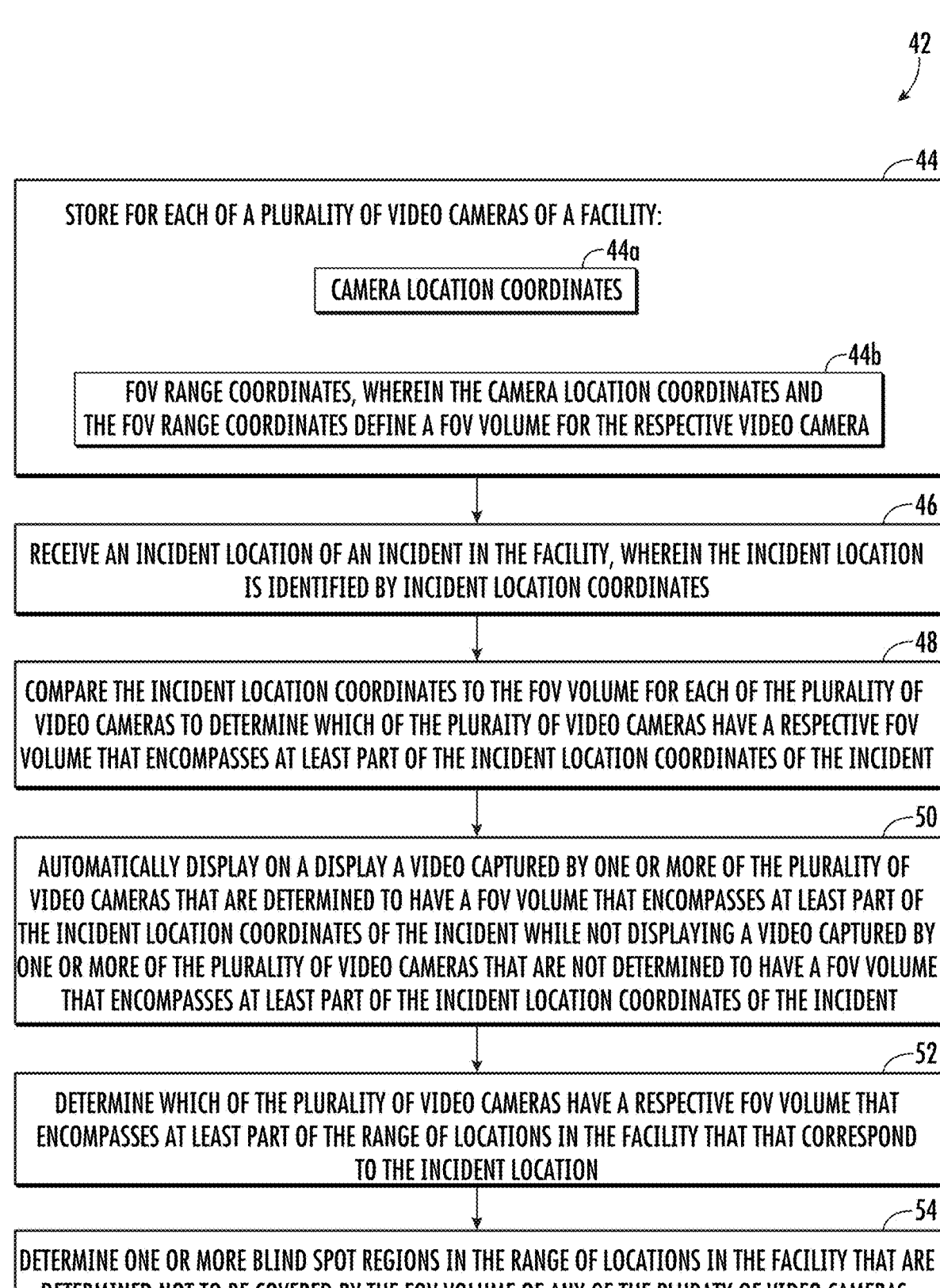

42

44

STORE FOR EACH OF A PLURALITY OF VIDEO CAMERAS OF A FACILITY:

44a

CAMERA LOCATION COORDINATES

44b

FOV RANGE COORDINATES, WHEREIN THE CAMERA LOCATION COORDINATES AND THE FOV RANGE COORDINATES DEFINE A FOV VOLUME FOR THE RESPECTIVE VIDEO CAMERA

46

RECEIVE AN INCIDENT LOCATION OF AN INCIDENT IN THE FACILITY, WHEREIN THE INCIDENT LOCATION IS IDENTIFIED BY INCIDENT LOCATION COORDINATES

48

COMPARE THE INCIDENT LOCATION COORDINATES TO THE FOV VOLUME FOR EACH OF THE PLURALITY OF VIDEO CAMERAS TO DETERMINE WHICH OF THE PLURAITY OF VIDEO CAMERAS HAVE A RESPECTIVE FOV VOLUME THAT ENCOMPASSES AT LEAST PART OF THE INCIDENT LOCATION COORDINATES OF THE INCIDENT

50

AUTOMATICALLY DISPLAY ON A DISPLAY A VIDEO CAPTURED BY ONE OR MORE OF THE PLURALITY OF VIDEO CAMERAS THAT ARE DETERMINED TO HAVE A FOV VOLUME THAT ENCOMPASSES AT LEAST PART OF THE INCIDENT LOCATION COORDINATES OF THE INCIDENT WHILE NOT DISPLAYING A VIDEO CAPTURED BY ONE OR MORE OF THE PLURALITY OF VIDEO CAMERAS THAT ARE NOT DETERMINED TO HAVE A FOV VOLUME THAT ENCOMPASSES AT LEAST PART OF THE INCIDENT LOCATION COORDINATES OF THE INCIDENT

52

DETERMINE WHICH OF THE PLURALITY OF VIDEO CAMERAS HAVE A RESPECTIVE FOV VOLUME THAT ENCOMPASSES AT LEAST PART OF THE RANGE OF LOCATIONS IN THE FACILITY THAT THAT CORRESPOND TO THE INCIDENT LOCATION

54

DETERMINE ONE OR MORE BLIND SPOT REGIONS IN THE RANGE OF LOCATIONS IN THE FACILITY THAT ARE DETERMINED NOT TO BE COVERED BY THE FOV VOLUME OF ANY OF THE PLURATY OF VIDEO CAMERAS.

FIG. 3

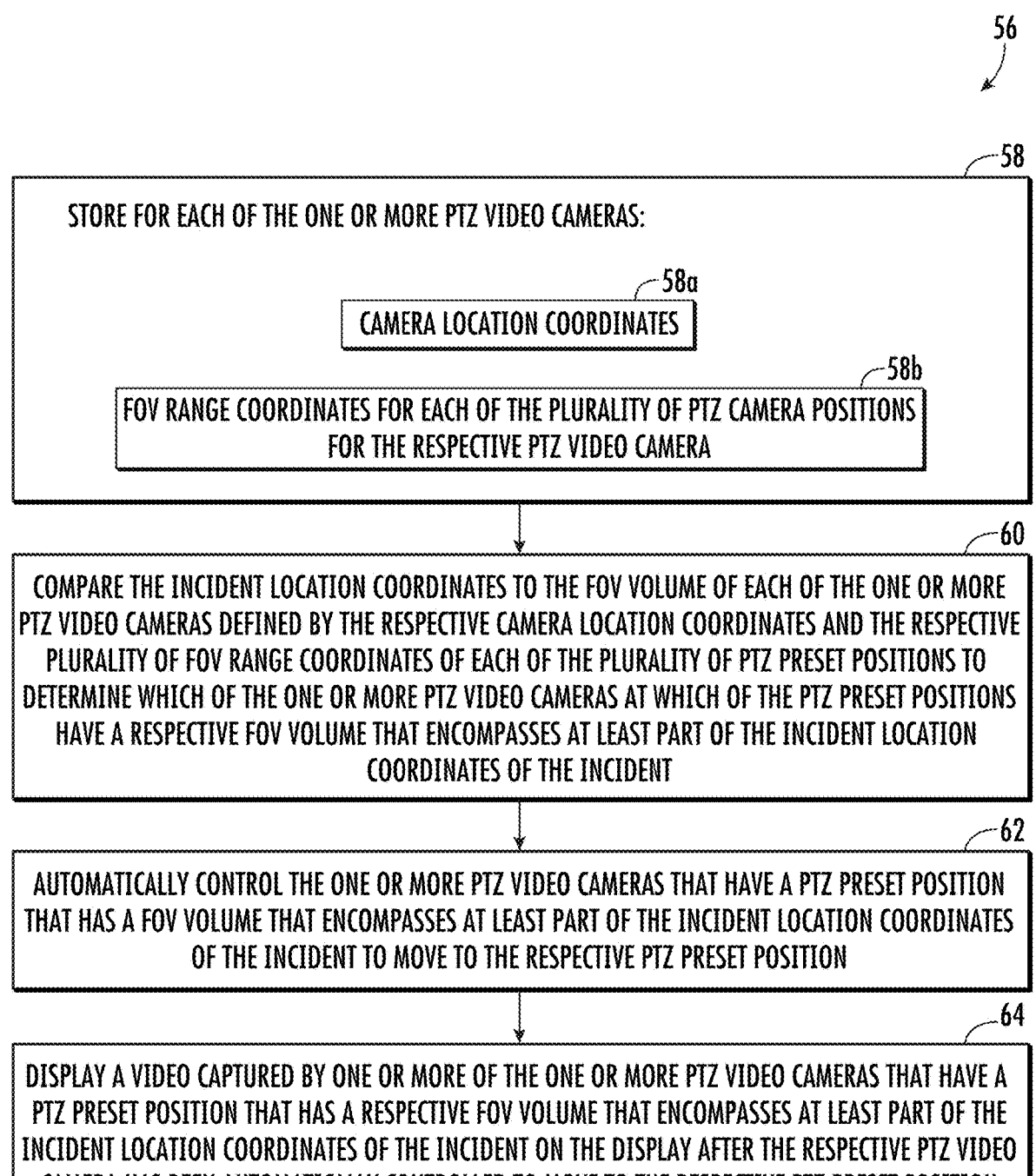

56

58

STORE FOR EACH OF THE ONE OR MORE PTZ VIDEO CAMERAS:

58a

CAMERA LOCATION COORDINATES

58b

FOV RANGE COORDINATES FOR EACH OF THE PLURALITY OF PTZ CAMERA POSITIONS FOR THE RESPECTIVE PTZ VIDEO CAMERA

60

COMPARE THE INCIDENT LOCATION COORDINATES TO THE FOV VOLUME OF EACH OF THE ONE OR MORE PTZ VIDEO CAMERAS DEFINED BY THE RESPECTIVE CAMERA LOCATION COORDINATES AND THE RESPECTIVE PLURALITY OF FOV RANGE COORDINATES OF EACH OF THE PLURALITY OF PTZ PRESET POSITIONS TO DETERMINE WHICH OF THE ONE OR MORE PTZ VIDEO CAMERAS AT WHICH OF THE PTZ PRESET POSITIONS HAVE A RESPECTIVE FOV VOLUME THAT ENCOMPASSES AT LEAST PART OF THE INCIDENT LOCATION COORDINATES OF THE INCIDENT

62

AUTOMATICALLY CONTROL THE ONE OR MORE PTZ VIDEO CAMERAS THAT HAVE A PTZ PRESET POSITION THAT HAS A FOV VOLUME THAT ENCOMPASSES AT LEAST PART OF THE INCIDENT LOCATION COORDINATES OF THE INCIDENT TO MOVE TO THE RESPECTIVE PTZ PRESET POSITION

64

DISPLAY A VIDEO CAPTURED BY ONE OR MORE OF THE ONE OR MORE PTZ VIDEO CAMERAS THAT HAVE A PTZ PRESET POSITION THAT HAS A RESPECTIVE FOV VOLUME THAT ENCOMPASSES AT LEAST PART OF THE INCIDENT LOCATION COORDINATES OF THE INCIDENT ON THE DISPLAY AFTER THE RESPECTIVE PTZ VIDEO CAMERA HAS BEEN AUTOMATICALLY CONTROLLED TO MOVE TO THE RESPECTIVE PTZ PRESET POSITION

FIG. 4

METHOD AND SYSTEM FOR RELIABLY IDENTIFYING AND PROVIDING A VIDEO FEED OF A DETECTED INCIDENT IN A VIDEO SURVEILLANCE SYSTEM

TECHNICAL FIELD

The present disclosure relates generally to video surveillance systems, and more particularly to automatically determining which video camera in the video surveillance system is appropriately positioned to capture an incident of interest.

BACKGROUND

A typical video surveillance system may include many video cameras distributed through a facility. In some cases, when an incident in the facility is detected, a request for a video feed that captures the incident is made. Current systems typically use an incident location of the incident to request a video feed from a camera that is nearest the incident location. However, this may not produce a video feed that captures the incident because the Field of View (FOV) of the camera that is nearest the incident location may, for example, be directed away from the location of incident. What would be desired are ways to reliably provide a video feed of a requested incident in a facility.

SUMMARY

The present disclosure relates generally to video surveillance systems, and more particularly to automatically determining which video camera in a video surveillance system is appropriately positioned to capture an incident of interest. An example may be found in a video surveillance system for a facility. The illustrative video surveillance system includes a plurality of video cameras that are each mounted at a respective camera location in the facility. Each of the respective camera locations correspond to respective camera location coordinates. Each of the plurality of video cameras has a Field of View (FOV) that extends out from the respective video camera to cover a respective FOV range that is defined by a plurality of respective FOV range coordinates. The respective camera location coordinates and the respective plurality of FOV range coordinates define a respective FOV volume for the respective video camera. A controller is operatively coupled to the plurality of video cameras. The controller is configured to receive an incident location of an incident in the facility, wherein the incident location is identified by incident location coordinates. The controller is configured to compare the incident location coordinates to the FOV volume for each of the plurality of video cameras to determine which of the plurality of video cameras have a respective FOV volume that encompasses at least part of the incident location coordinates of the incident. The controller is configured to automatically display on a display of an operator console a video captured by one or more of the plurality of video cameras that are determined to have a FOV volume that encompasses at least part of the incident location coordinates of the incident while not displaying a video captured by one or more of the plurality of video cameras that are not determined to have a FOV volume that encompasses at least part of the incident location coordinates of the incident.

Another example may be found in a method for operating a surveillance system of a facility in which the surveillance system includes a plurality of video cameras each mounted at a respective camera location in the facility. Each of the respective camera locations correspond to respective camera location coordinates and each of the plurality of video cameras has a Field of View (FOV) that extends out from the respective video camera to cover a respective FOV range. The respective FOV range is defined by a plurality of respective FOV range coordinates. The respective camera location coordinates and the respective plurality of FOV range coordinates define a respective FOV volume for the respective video camera. The method includes receiving an incident location of an incident in the facility, wherein the incident location is identified by incident location coordinates. The incident location coordinates are compared to the FOV volume for each of the plurality of video cameras and a determination is made as to which of the plurality of video cameras have a respective FOV volume that encompasses at least part of the incident location coordinates of the incident. The method includes switching to display on a display of an operator console a video captured by one or more of the plurality of video cameras that are determined to have a FOV volume that encompasses at least part of the incident location coordinates of the incident.

Another example may be found in a non-transitory computer readable medium storing instructions. When the instructions are executed by one or more processors, the one or more processors are caused to store camera location coordinates and FOV range coordinates, which together define a FOV volume for the respective video camera. The one or more processors are caused to receive an incident location of an incident in the facility, wherein the incident location is identified by incident location coordinates. The one or more processors are caused to compare the incident location coordinates to the FOV volume for each of the plurality of video cameras to determine which of the plurality of video cameras have a respective FOV volume that encompasses at least part of the incident location coordinates of the incident. The one or more processors are caused to automatically display on a display a video captured by one or more of the plurality of video cameras that are determined to have a FOV volume that encompasses at least part of the incident location coordinates of the incident while not displaying a video captured by one or more of the plurality of video cameras that are not determined to have a FOV volume that encompasses at least part of the incident location coordinates of the incident.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which:

FIG. 2 is a flow diagram showing an illustrative method for operating the video surveillance system of FIG. 1;

FIG. 3 is a flow diagram showing an illustrative series of steps that may be carried out by one or more processors executing instructions stored on a non-transitory computer-readable storage medium;

FIG. 4 is a flow diagram showing another illustrative series of steps that may be carried out by one or more processors executing instructions stored on a non-transitory computer-readable storage medium;

Figure 1:
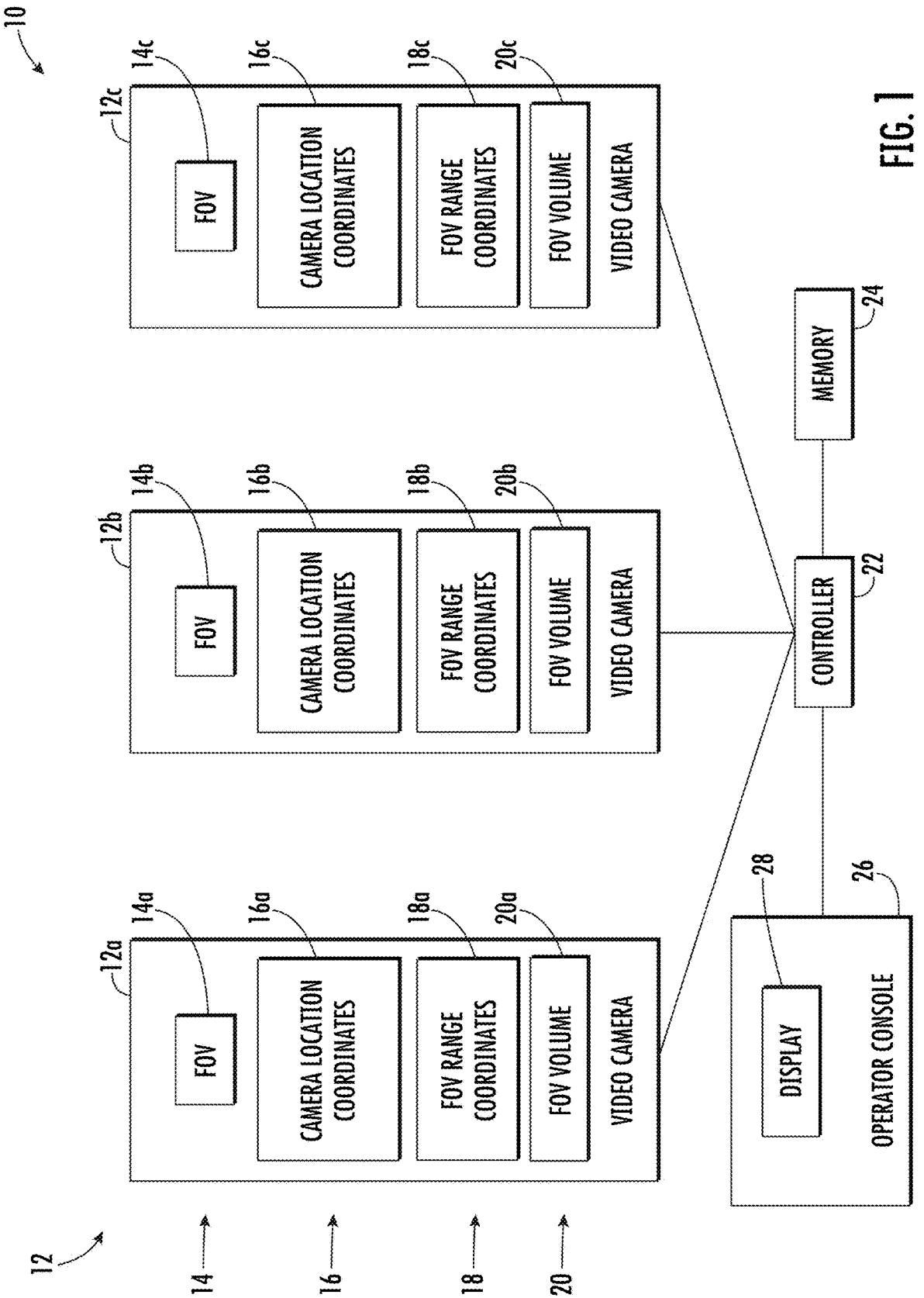
FIG. 1 is a schematic block diagram showing an illustrative video surveillance system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram showing an illustrative video surveillance system 10 for a facility. The illustrative video surveillance system 10 includes a plurality of video cameras 12 individually labeled as 12a, 12b and 12c. While a total of three video cameras 12 are shown, it will be appreciated that in some cases the video surveillance system 10 may include tens, hundreds or even thousands of video cameras 12. Each of the video cameras 12 have a Field of View (FOV) 14, individually labeled as 14a, 14b and 14c, that extends out from the respective video camera 12 to cover a respective FOV range that defines what each video camera 12 is able to see. Each of the video cameras 12 are mounted at a respective camera location within the facility. Each of the respective camera locations correspond to respective camera location coordinates 16, individually labeled as 16a, 16b and 16c. The respective FOV range for each of the video cameras 12 is defined by a plurality of respective FOV range coordinates 18, individually labeled as 18a, 18b and 18c. In some cases, the FOV range is based at least in part on one or more camera parameters that are associated with the respective video camera 12. As an example, the one or more camera parameters may include one or more of focal length, aperture size and sensor size. The respective camera location coordinates 16 and the respective plurality of FOV range coordinates 18 define a respective FOV volume 20, individually labeled as 20a, 20b and 20c, for the respective video camera 12. A controller 22 is operatively coupled to each of the video cameras 12. In some cases, a memory 24 is operatively coupled to the controller 22. In some cases, the memory 24 may store the respective camera location coordinates 16 and the respective FOV range coordinates 18 for each of the video cameras 12. In some cases, the video surveillance system 10 includes an operator console 26 that includes a display 28.

The controller 22 is configured to receive an incident location of an incident in the facility, wherein the incident location is identified by incident location coordinates. In some cases, the camera location coordinates 16, the FOV range coordinates 18 and the incident location coordinates may be expressed in a common coordinate system. In some cases, the plurality of FOV range coordinates 18 for each of the plurality of video cameras 12 may be dependent on a vertical tilt angle of the respective video camera 12. In some cases, the plurality of FOV range coordinates 18 for each of the plurality of video cameras 12 may be dependent on a horizontal pointing direction of the respective video camera 12 from the camera location coordinates. The controller 22 is configured to compare the incident location coordinates to the FOV volume 20 for each of the plurality of video cameras 12 to determine which of the plurality of video cameras 12 have a respective FOV volume 20 that encompasses at least part of the incident location coordinates of the incident. The controller 22 is configured to automatically display on the display 28 of the operator console 26 a video captured by one or more of the plurality of video cameras 12 that are determined to have a FOV volume 20 that encompasses at least part of the incident location coordinates of the incident while not displaying a video captured by one or more of the plurality of video cameras 12 that are not determined to have a FOV volume 20 that encompasses at least part of the incident location coordinates of the incident.

In some cases, one or more of the video cameras 12 are PTZ (Pan Tilt Zoom) cameras that have a plurality of PTZ camera positions. The memory 24 may store respective FOV range coordinates for each of the plurality of PTZ camera positions for each of the one or more PTZ video cameras. In some cases, the controller 22 may be configured to compare the incident location coordinates to the FOV volume 20 of each of the one or more PTZ video cameras 12 defined by the respective camera location coordinates 16 and the respective plurality of FOV range coordinates 18 of each of the plurality of PTZ preset positions to determine which of the one or more PTZ video cameras 12 at which of the PTZ preset positions have a respective FOV volume 20 that encompasses at least part of the incident location coordinates of the incident. The controller 22 may be configured to automatically control the one or more PTZ video cameras 12 that have a PTZ preset position that has a FOV volume 20 that encompasses at least part of the incident location coordinates of the incident to move to the respective PTZ preset position. The controller 22 may be configured to display a video captured by one or more of the one or more PTZ video cameras 12 that have a PTZ preset position that has a respective FOV volume 20 that encompasses at least part of the incident location coordinates of the incident on the display 28 after the respective PTZ video camera 12 has been automatically controlled to move to the respective PTZ preset position.

In some cases, the incident location may include a range of locations within a facility. The controller 22 may be configured to determine which of the plurality of video cameras 12 have a respective FOV volume 20 that encompasses at least part of the range of locations in the facility that correspond to the incident location. In some cases, the controller 22 may be configured to determine one or more blind spot regions in the range of locations in the facility that are determined not to be covered by the FOV volume 20 of any of the plurality of video cameras 12.

FIG. 2 is a flow diagram showing an illustrative method 30 for operating a surveillance system (such as the video surveillance system 10) of a facility, wherein the surveillance system includes a plurality of video cameras (such as the video cameras 12) each mounted at a respective camera location in the facility, wherein each of the respective camera locations correspond to respective camera location coordinates (such as the camera location coordinates 16), each of the plurality of video cameras has a Field of View (FOV) (such as the FOV 14) that extends out from the respective video camera to cover a respective FOV range, wherein the respective FOV range is defined by a plurality of respective FOV range coordinates (such as the FOV range coordinates 18), and wherein the respective camera location coordinates and the respective plurality of FOV range coordinates define a respective FOV volume (such as the FOV volume 20) for the respective video camera. The method 30 includes receiving an incident location of an incident in the facility, wherein the incident location is identified by incident location coordinates, as indicated at block 32. The incident location may include a range of locations within the facility. The incident location coordinates are compared to the FOV volume for each of the plurality of video cameras and the method includes determining which of the plurality of video cameras have a respective FOV volume that encompasses at least part of the incident location coordinates of the incident, as indicated at block 34. The method 30 includes switching to display on a display of an operator console a video captured by one or more of the plurality of video cameras that are determined to have a FOV volume that encompasses at least part of the incident location coordinates of the incident, as indicated at block 36.

In some cases, the method 30 may further include determining which of the plurality of video cameras have a respective FOV volume that encompasses at least part of the range of locations in the facility that correspond to the incident location, as indicated at block 38. In some cases, the method 30 may include determining one or more blind spot regions in the range of locations in the facility that are determined not to be covered by the FOV volume of any of the plurality of video cameras, as indicated at block 40, and report the blind spot to the operator console.

FIG. 3 is a flow diagram showing an illustrative series of steps 42 that may be carried out by one or more processors when the one or more processors execute instructions stored on a non-transitory computer-readable storage medium. In some cases, the one or more processors may be part of the controller 22. The one or more processors are caused to store information for each of the plurality of video cameras, as indicated at block 44. The one or more processors are caused to store camera location coordinates, as indicated at block 44a. The one or more processors are caused to store FOV range coordinates, wherein the camera location coordinates and the FOV range coordinates define a FOV volume for the respective video camera, as indicated at block 44b. The one or more processors are caused to receive an incident location of an incident in the facility, wherein the incident location is identified by incident location coordinates, as indicated at block 46. In some cases, the incident location may include a range of locations within the facility. The one or more processors are caused to compare the incident location coordinates to the FOV volume for each of the plurality of video cameras to determine which of the plurality of video cameras have a respective FOV volume that encompasses at least part of the incident location coordinates of the incident, as indicated at block 48. The one or more processors are caused to automatically display on a display a video captured by one or more of the plurality of video cameras that are determined to have a FOV volume that encompasses at least part of the incident location coordinates of the incident while not displaying a video captured by one or more of the plurality of video cameras that are not determined to have a FOV volume that encompasses at least part of the incident location coordinates of the incident, as indicated at block 50.

In some cases, the instructions may cause the one or more processors to determine which of the plurality of video cameras have a respective FOV volume that encompasses at least part of the range of locations in the facility that correspond to the incident location, as indicated at block 52. In some cases, the instructions may cause the one or more processors to determine one or more blind spot regions in the range of locations in the facility that are determined not to be covered by the FOV volume of any of the plurality of video cameras, as indicated at block 54.

FIG. 4 is a flow diagram showing an illustrative series of steps 56 that may be carried out by one or more processors when the one or more processors execute instructions stored on a non-transitory computer-readable storage medium. In some cases, the one or more processors may be part of the controller 22. One or more of the video cameras may be PTZ video cameras. The one or more processors are caused to store information for each of the PTZ video cameras, as indicated at block 58. The one or more processors are caused to store camera location coordinates, as indicated at block 58a. The one or more processors are caused to store FOV range coordinates for each of the plurality of PTZ camera positions for the respective PTZ video camera, as indicated at block 58b. The one or more processors are caused to compare the incident location coordinates to the FOV volume of each of the one or more PTZ video cameras defined by the respective camera location coordinates and the respective plurality of FOV range coordinates of each of the plurality of PTZ preset positions to determine which of the one or more PTZ video cameras at which of the PTZ preset positions have a respective FOV volume that encompasses at least part of the incident location coordinates of the incident, as indicated at block 60. The one or more processors are caused to automatically control the one or more PTZ video cameras that have a PTZ preset position that has a FOV volume that encompasses at least part of the incident location coordinates of the incident to move to the respective PTZ preset position, as indicated at block 62. The one or more processors are caused to display a video captured by one or more of the one or more PTZ video cameras that have a PTZ preset position that has a respective FOV volume that encompasses at least part of the incident location coordinates of the incident on the display after the respective PTZ video camera has been automatically controlled to move to the respective PTZ preset position, as indicated at block 64.

Figure 5:
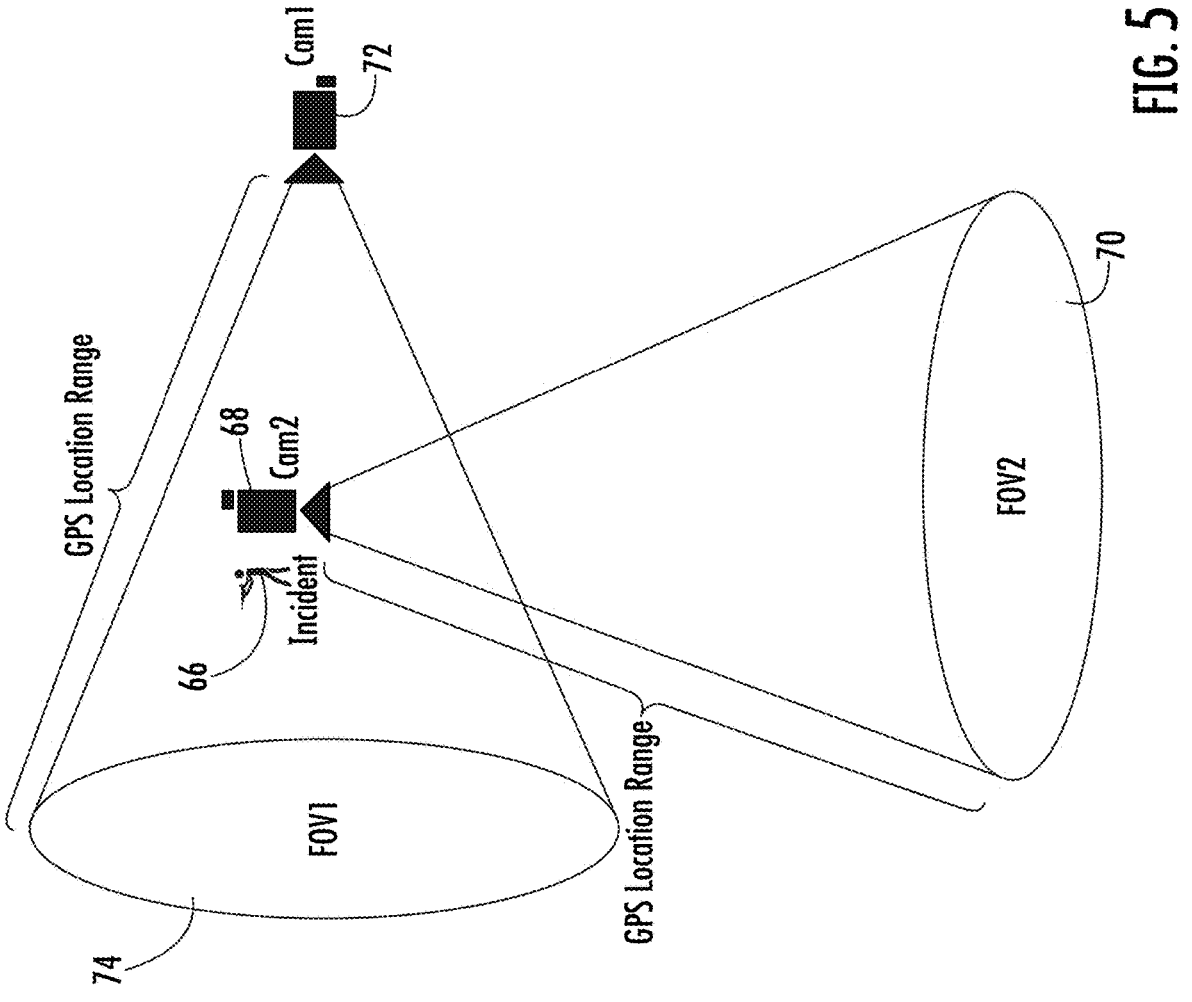
FIG. 5 provides a graphical representation showing that a particular video camera that is closest to the location of an incident may not be in the best position to capture the incident.

FIG. 5 provides a graphical representation showing that a particular video camera that is closest to the location of an incident may not be in the best position to capture the incident. As can be seen, an incident 66 occurs a particular incident location. A camera 68, while being closest to the incident 66, has a FOV volume 70 that does not capture the incident 66, and thus is not positioned to capture the incident 66. However, a camera 72 that is farther away from the incident 66 has a FOV volume 74 that captures the incident 66.

Figure 6:
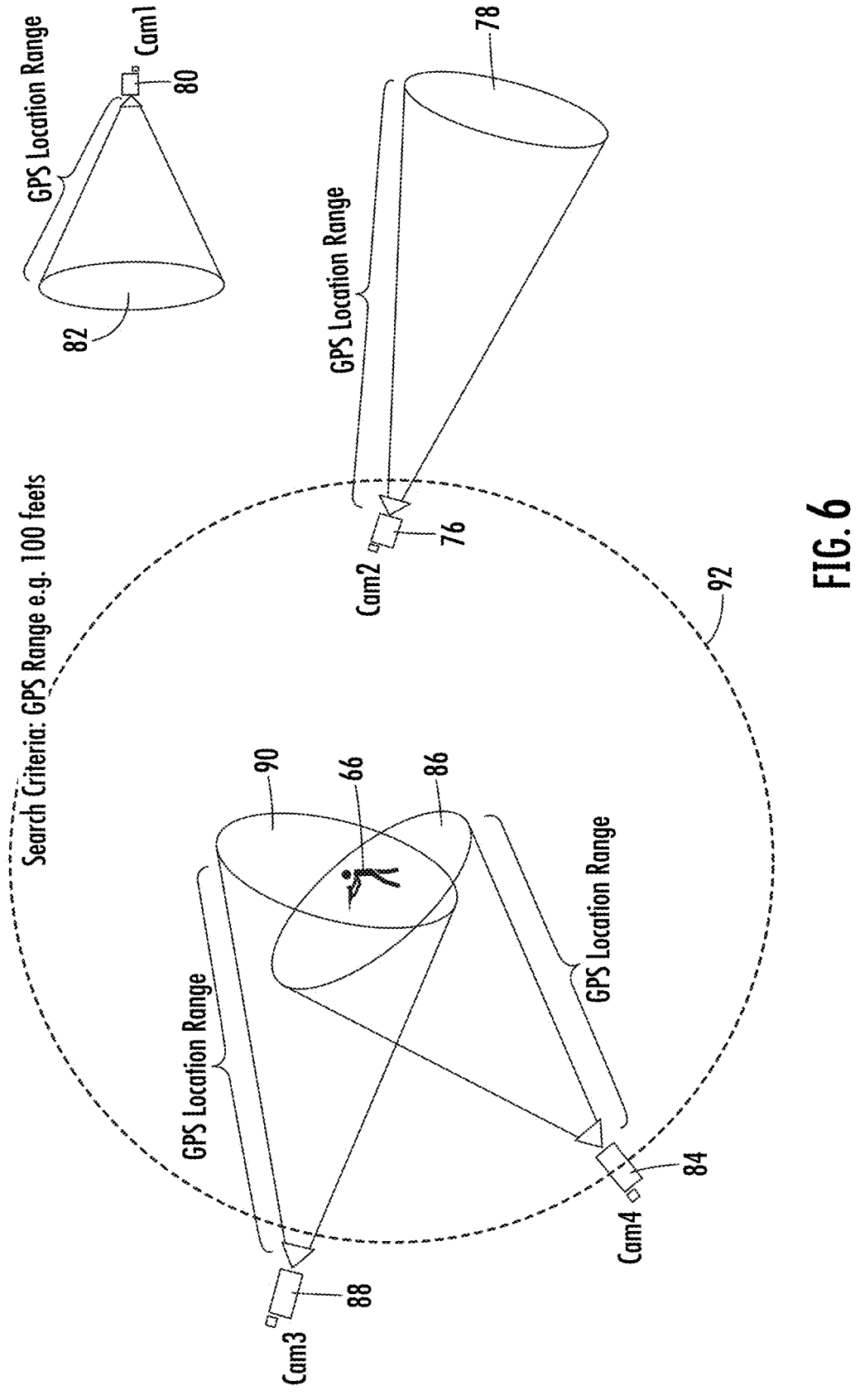
FIG. 6 provides a graphical representation showing determining which video camera(s) are appropriately positioned to capture an incident.

FIG. 6 provides a graphical representation showing determining which video camera is appropriately positioned to capture the incident 66. While a camera 76 is physically closest to the incident 66, the camera 76 has a FOV volume 78 that does not capture the incident 66. Likewise, a camera 80 has a FOV volume 82 that does not capture the incident 66. However, a camera 84 has a FOV volume 86 that does capture the incident 66. Moreover, a camera 88 has a FOV volume 90 that also captures the incident 66 but from a further distance away. Accordingly, either the camera 84 or the camera 88 may be used to capture the incident 66. In some cases, a search criteria may be provided by an operator to search for cameras that are within a particular distance from the incident 66, as indicated by a dashed circle 92. As an example, the distance may be 100 feet. By this illustrative criteria, the camera 80 would not have been found by the search even though its FOV volume 90 captures the incident 66. Such a search criteria may be used to, for example, filter out cameras that are deemed to be too far away to capture a level of detail of the incident that is desired by the operator.

Figure 7:
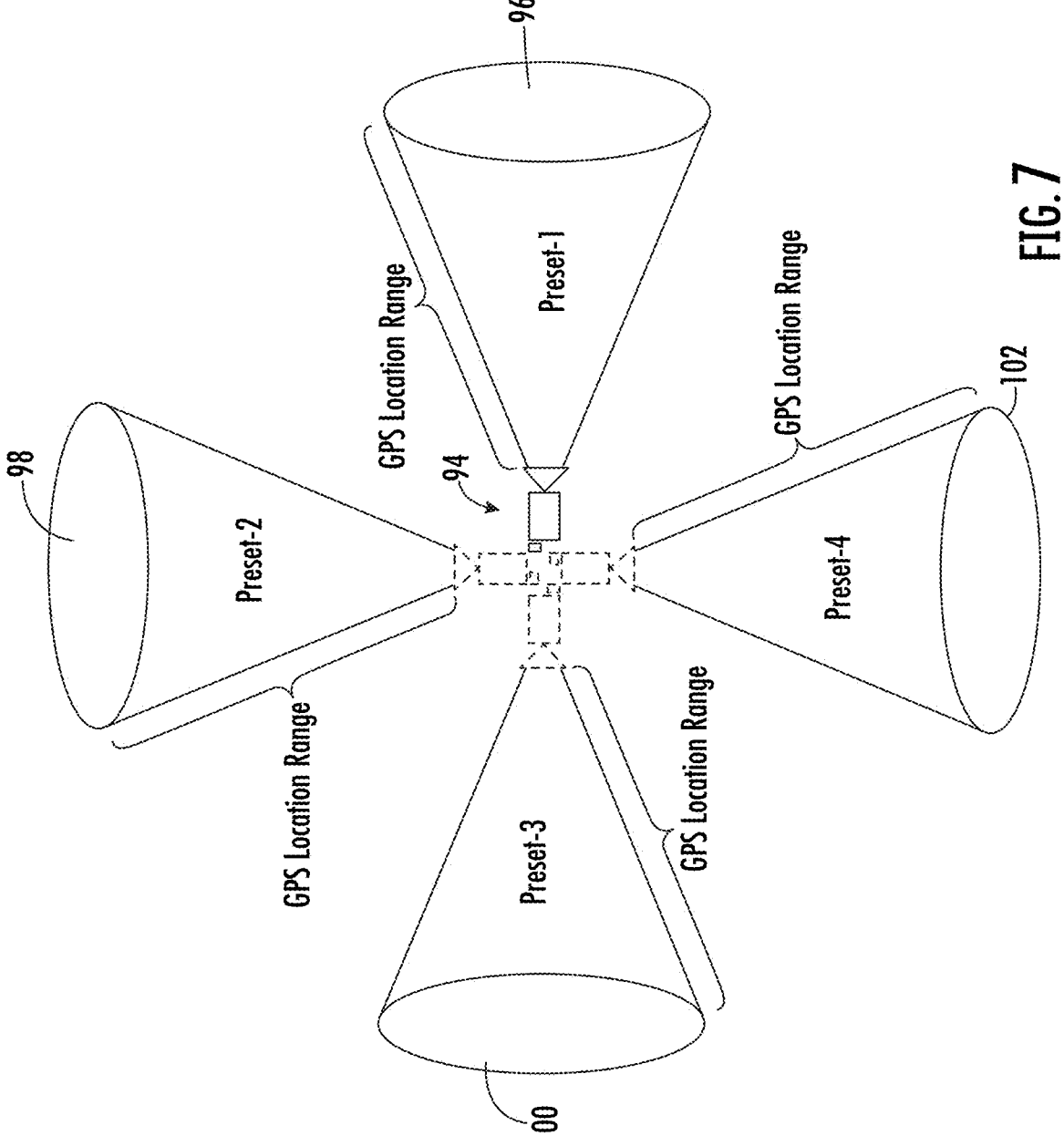
FIG. 7 provides a graphical representation showing multiple FOV presets that may be assigned to a PTZ camera.

FIG. 7 provides a graphical representation showing multiple FOV presets that may be assigned to a PTZ camera 94. As shown, the FOV presets correspond to four positions that are 90 degrees apart. It will be appreciated that the PTZ camera 94 may move in multiple planes. As shown, each of the presets correspond to a particular FOV volume 96, 98, 100 and 102, respectively.

Figure 8:
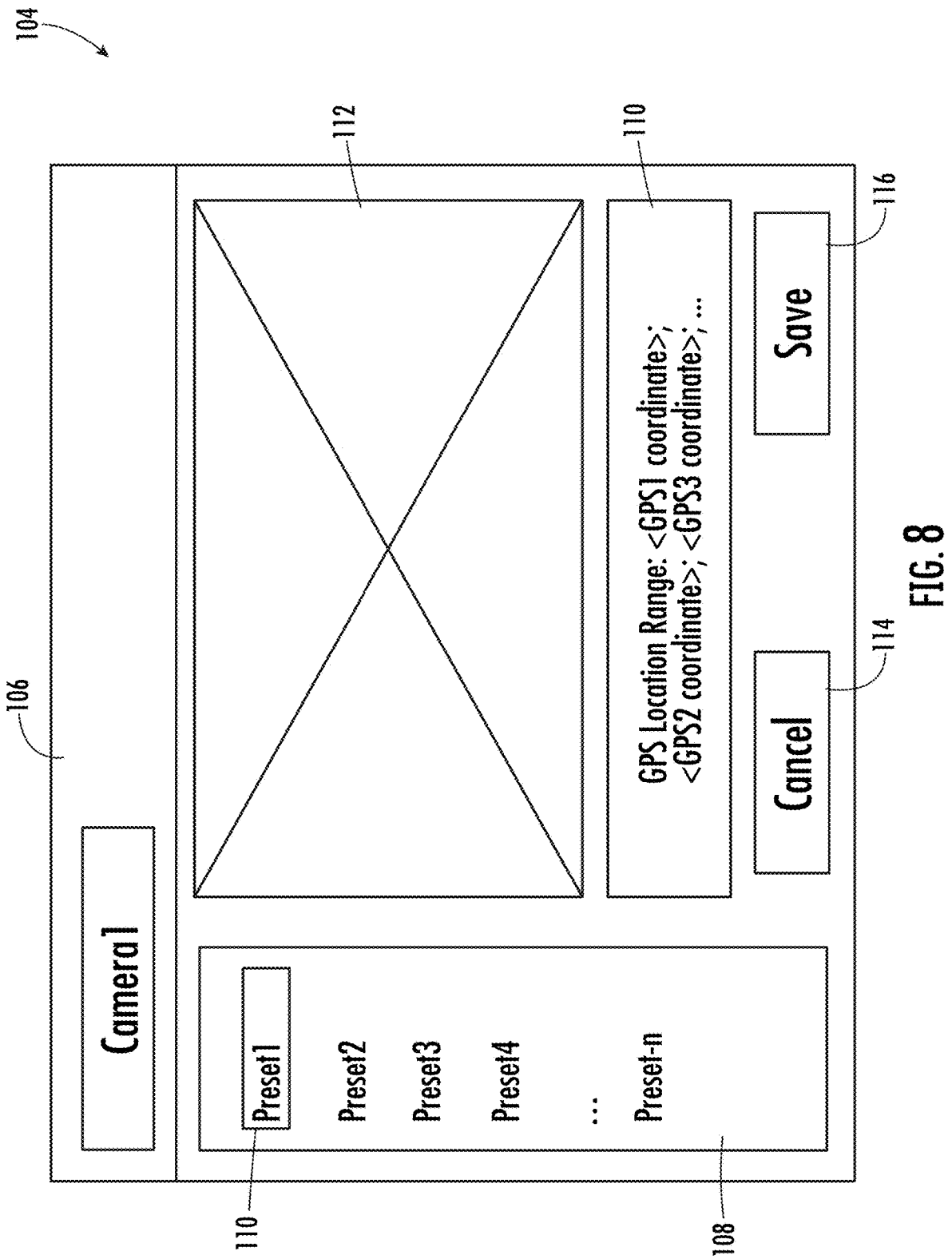
FIG. 8 provides a graphical representation of a screen that may be displayed for the PTZ camera of FIG. 7.

FIG. 8 provides a graphical representation of a screen 104 that may be displayed on the display 28 of the operator console 26 for the PTZ camera of FIG. 7. The screen 104 includes a title bar 106 indicating that Camera 1 is currently selected. On the left side, a menu 108 allows a user to select between multiple FOV presets for camera 1. As shown, FOV preset 1 has been selected. Accordingly, the screen 104 includes a region 110 that provides the coordinates (e.g. GPS or other coordinates) that define the respective FOV range coordinates for the FOV preset 1. The screen 104 further includes a region 112 that may be used to display a current image captured by Camera 1, for example. The screen 104 includes a Cancel button 114 that may be used to cancel and a Save button 116 that may be used to save any changes to the FOV for the selected preset and the corresponding FOV range coordinates.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A video surveillance system for a facility, comprising:
a plurality of video cameras each mounted at a respective camera location in the facility, wherein each of the respective camera locations correspond to respective camera location coordinates, each of the plurality of video cameras has a Field of View (FOV) that extends out from the respective video camera to cover a respective FOV range, wherein the respective FOV range is defined by a plurality of respective FOV range coordinates, wherein the respective camera location coordinates and the respective plurality of FOV range coordinates define a respective FOV volume for the respective video camera;
a controller operatively coupled to the plurality of video cameras, the controller configured to:
receive an incident location of an incident in the facility, wherein the incident location is identified by incident location coordinates;
compare the incident location coordinates to the FOV volume for each of the plurality of video cameras to determine which of the plurality of video cameras have a respective FOV volume that encompasses at least part of the incident location coordinates of the incident; and
automatically display on a display of an operator console a video captured by one or more of the plurality of video cameras that are determined to have a FOV volume that encompasses at least part of the incident location coordinates of the incident while not displaying a video captured by one or more of the plurality of video cameras that are not determined to have a FOV volume that encompasses at least part of the incident location coordinates of the incident.

2. The system of claim 1, wherein the camera location coordinates, the FOV range coordinates and the incident location coordinates are expressed in a common coordinate system.

3. The system of claim 1, wherein the FOV range of each of the plurality of video cameras is based at least in part on one or more camera parameters associated with the respective video camera.

4. The system of claim 3, wherein the one or more camera parameters comprises one or more of focal length, aperture size and sensor size.

5. The system of claim 1, wherein the plurality of FOV range coordinates for each of the plurality of video cameras are dependent on one or more of:
a vertical tilt angle of the respective video camera; and
a horizontal pointing direction of the respective camera.

6. The system of claim 1, further comprising a memory accessible by the controller that stores:
the respective camera location coordinates for each of the plurality of video cameras; and
the respective FOV range coordinates for each of the plurality of video cameras.

7. The system of claim 6, wherein one or more of the plurality of video cameras is a Pan-Tilt-Zoom (PTZ) video camera having a plurality of PTZ camera positions, wherein the memory stores:
the respective camera location coordinates for each of the one or more PTZ video cameras; and the respective FOV range coordinates for each of the plurality of PTZ camera positions for each of the one or more PTZ video cameras.

8. The system of claim 7, wherein each of the plurality of PTZ camera positions stored in the memory for each of the one or more PTZ video cameras corresponds to a respective PTZ preset position, and wherein the controller is configured to:

compare the incident location coordinates to the FOV volume of each of the one or more PTZ video cameras defined by the respective camera location coordinates and the respective plurality of FOV range coordinates of each of the plurality of PTZ preset positions to determine which of the one or more PTZ video cameras at which of the PTZ preset positions have a respective FOV volume that encompasses at least part of the incident location coordinates of the incident;

automatically control the one or more PTZ video cameras that have a PTZ preset position that has a FOV volume that encompasses at least part of the incident location coordinates of the incident to move to the respective PTZ preset position; and display a video captured by one or more of the one or more PTZ video cameras that have a PTZ preset position that has a respective FOV volume that encompasses at least part of the incident location coordinates of the incident on the display after the respective PTZ video camera has been automatically controlled to move to the respective PTZ preset position.

9. The system of claim 1, wherein the incident location includes a range of locations in the facility.

10. The system of claim 9, wherein the controller is configured to determine which of the plurality of video cameras have a respective FOV volume that encompasses at least part of the range of locations in the facility that correspond to the incident location.

11. The system of claim 9, wherein the controller is configured to determine one or more blind spot regions in the range of locations in the facility that are determined not to be covered by the FOV volume of any of the plurality of video cameras.

12. A method for operating a surveillance system of a facility, wherein the surveillance system includes a plurality of video cameras each mounted at a respective camera location in the facility, wherein each of the respective camera locations correspond to respective camera location coordinates, each of the plurality of video cameras has a Field of View (FOV) that extends out from the respective video camera to cover a respective FOV range, wherein the respective FOV range is defined by a plurality of respective FOV range coordinates, wherein the respective camera location coordinates and the respective plurality of FOV range coordinates define a respective FOV volume for the respective video camera, the method comprising:

receiving an incident location of an incident in the facility, wherein the incident location is identified by incident location coordinates;

comparing the incident location coordinates to the FOV volume for each of the plurality of video cameras and determining which of the plurality of video cameras have a respective FOV volume that encompasses at least part of the incident location coordinates of the incident; and switching to display on a display of an operator console a video captured by one or more of the plurality of video cameras that are determined to have a FOV volume that encompasses at least part of the incident location coordinates of the incident.

13. The method of claim 12, wherein the incident location includes a range of locations in the facility.

14. The method of claim 13, comprising determining which of the plurality of video cameras have a respective FOV volume that encompasses at least part of the range of locations in the facility that correspond to the incident location.

15. The method of claim 13, comprising determining one or more blind spot regions in the range of locations in the facility that are determined not to be covered by the FOV volume of any of the plurality of video cameras.

16. A non-transitory computer readable medium storing instructions that when executed by one or more processors cause the one or more processors to:

store for each of a plurality of video cameras of a facility:

camera location coordinates;

FOV range coordinates, wherein the camera location coordinates and the FOV range coordinates define a FOV volume for the respective video camera;

receive an incident location of an incident in the facility, wherein the incident location is identified by incident location coordinates;

compare the incident location coordinates to the FOV volume for each of the plurality of video cameras to determine which of the plurality of video cameras have a respective FOV volume that encompasses at least part of the incident location coordinates of the incident; and automatically display on a display a video captured by one or more of the plurality of video cameras that are determined to have a FOV volume that encompasses at least part of the incident location coordinates of the incident while not displaying a video captured by one or more of the plurality of video cameras that are not determined to have a FOV volume that encompasses at least part of the incident location coordinates of the incident.

17. The non-transitory computer readable medium of claim 16, wherein the incident location includes a range of locations in the facility.

18. The non-transitory computer readable medium of claim 17, wherein the instructions cause the one or more processors to determine which of the plurality of video cameras have a respective FOV volume that encompasses at least part of the range of locations in the facility that correspond to the incident location.

19. The non-transitory computer readable medium of claim 17, wherein the instructions cause the one or more processors to determine one or more blind spot regions in the range of locations in the facility that are determined not to be covered by the FOV volume of any of the plurality of video cameras.

20. The non-transitory computer readable medium of claim 16, wherein one or more of the plurality of video cameras is a Pan-Tilt-Zoom (PTZ) video camera having a plurality of PTZ preset positions, wherein the instructions cause the one or more processors to:

store for each of the one or more PTZ video cameras:

camera location coordinates;

FOV range coordinates for each of the plurality of PTZ camera positions for the respective PTZ video camera;

compare the incident location coordinates to the FOV volume of each of the one or more PTZ video cameras defined by the respective camera location coordinates and the respective plurality of FOV range coordinates of each of the plurality of PTZ preset positions to
determine which of the one or more PTZ video cameras
at which of the PTZ preset positions have a respective
FOV volume that encompasses at least part of the
incident location coordinates of the incident;
automatically control the one or more PTZ video cameras
that have a PTZ preset position that has a FOV volume
that encompasses at least part of the incident location
coordinates of the incident to move to the respective
PTZ preset position; and
display a video captured by one or more of the one or
more PTZ video cameras that have a PTZ preset
position that has a respective FOV volume that encom-
passes at least part of the incident location coordinates
of the incident on the display after the respective PTZ
video camera has been automatically controlled to
move to the respective PTZ preset position.

* * * * *